United States Patent [19]

Fabel

[11] 3,976,332

[45] Aug. 24, 1976

[54] POWDER FEED DEVICE FOR FLAME SPRAY GUNS

[75] Inventor: Arthur J. Fabel, Westbury, N.Y.

[73] Assignee: Metco, Inc., Westbury, N.Y.

[22] Filed: Jan. 19, 1972

[21] Appl. No.: 218,888

Related U.S. Application Data

[63] Continuation of Ser. No. 836,929, June 26, 1969, abandoned.

[52] U.S. Cl. ................................................. 302/57
[51] Int. Cl.$^2$............................................. B65G 53/40
[58] Field of Search .................. 302/52, 57, 29, 53; 222/195

[56] References Cited

UNITED STATES PATENTS

| 2,758,564 | 8/1956 | Randall................................ 302/29 |
| 2,792,262 | 5/1957 | Hatborn............................... 302/52 |
| 2,941,842 | 6/1960 | Wishaw................................ 302/52 |
| 3,236,422 | 2/1966 | Bailey et al. ........................ 222/195 |
| 3,501,062 | 3/1970 | De Witt et al. .................. 222/195 X |

Primary Examiner—Allen N. Knowles
Assistant Examiner—Hadd Lane
Attorney, Agent, or Firm—Burgess, Dinklage & Sprung

[57] ABSTRACT

A device for feeding metal powders suspended in a conveying gas uniformly and controllably to a point of utilization such as a flame spray gun comprising an enclosed hopper which contains the powder in particulate loose and by and large unfluidized form and is supplied in its upper portion with a controlled amount of fluidizing gas. A conduit with a downwardly opening powder intake conduit passes through the lower portion of the hopper and is supplied with a conveying gas at a pre-determined rate. The fluidizing gas passes through the mass of solids and is diffused thereby. It converges towards the orifice, suspends the powder in the vicinity of the orifice, upturning into the orifice to do so, and propels the fluidized powder therethrough into the conveying gas. The amount of fluidizing gas flow determines the amount of solids placed in the conveying gas. The fluidizing gas flow is controlled inversely responsive to the pressure at a point in the conveying gas line.

Preferably, a fluidic amplifier or controller is integrated into the system for the purpose of regulating the flow of the fluidizing gas. In this embodiment, the control gas for the amplifier is tapped from the conveying gas line upstream of the solids inlet orifice. The flow of control gas is thereby automatically regulated by the pressure in the control gas line at the point of tapping, which pressure is responsive to the mass flow rate in the conveying gas line downstream of the solids inlet orifice.

9 Claims, 1 Drawing Figure

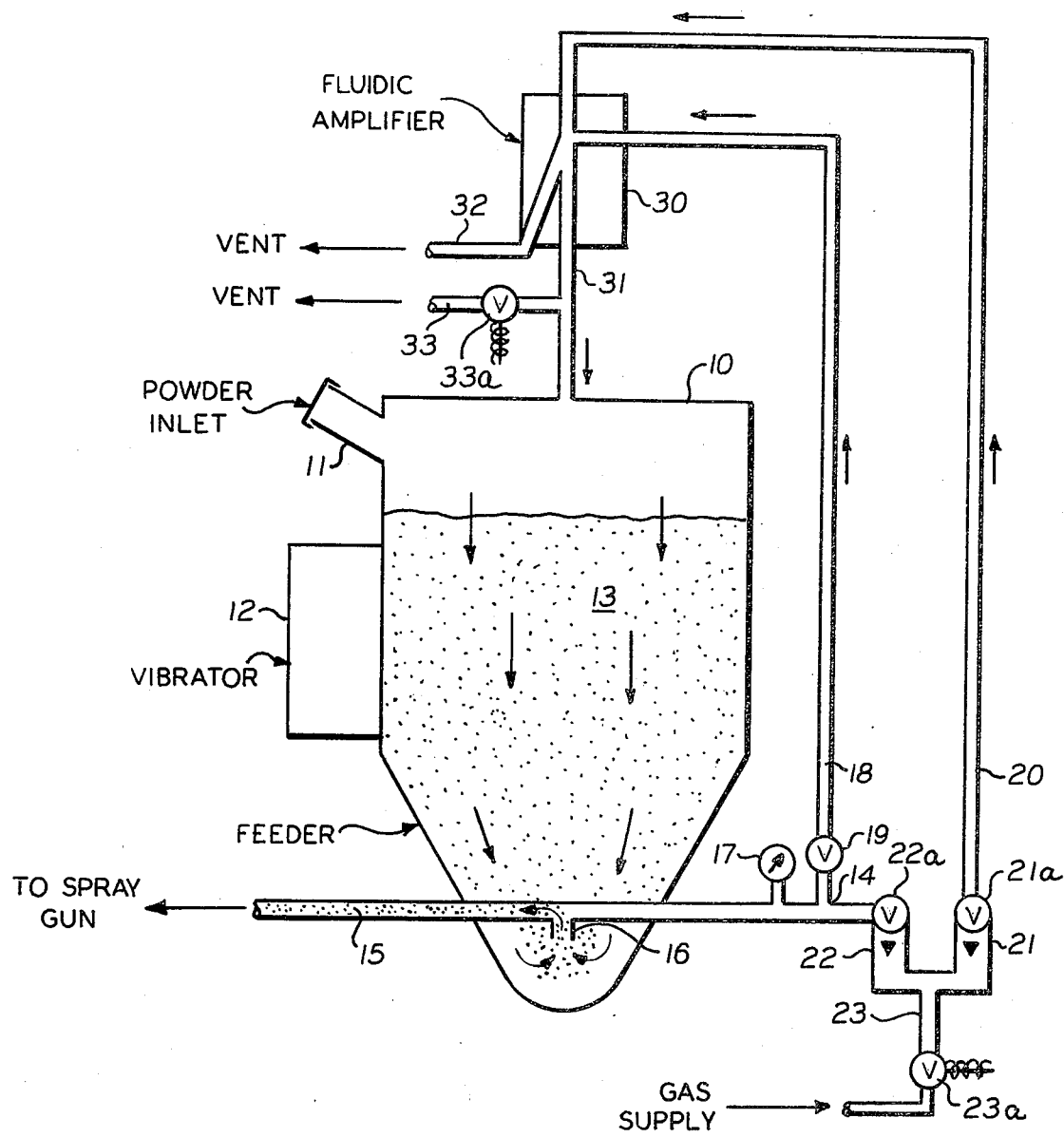

POWDER FEED DEVICE FOR FLAME SPRAY GUNS

RELATED APPLICATION

This application is a continuation of U.S. Ser. No. 836,929, filed June 26, 1969, now abandoned.

BACKGROUND OF THE INVENTION

Flame spraying involves the heat-softening of the heat-fusible material, such as a metal or ceramic and the propelling of the softened material in particulate form against a surface to be coated to which the heat-fusible material bonds. A flame spray gun is usually used for this purpose and with one type, the heat-fusible material is supplied in powder form to the gun. The powder is of quite small particle size, e.g. below about 100 mesh U.S. Standard screen size, and as small as one micron and is difficult to meter and control.

A flame spray gun normally utilizes a combustion or plasma flame to effect melting of the powder, but other heating means, such as electric arcs, resistance heaters or induction heaters can also be used, alone or in combination. In a powder-type combustion flame spray gun, the carrier gas for the powder can be one of the combustion gases or compressed air. In a plasma flame spray gun the carrier gas is generally the same as the primary plasma gas, although other gases such as hydrocarbon are used in special cases.

To obtain high quality coatings, it is necessary to accurately control the rate of the powder fed through the gun and to maintain the same constant for a given set of spray conditions. The type of fine powder used is a very difficult material to handle and to feed with any uniformity into a carrier gas. While various apparatus of different designs and modes of operation based on gravity, mechanical and gas conveying, and combinations thereof, have been proposed such devices almost universally suffer from a lack of reliability in maintaining a constant controlled powder feed rate and are often subject to mechanical wear and breakdown.

Also, the prior art has found it to be difficult to determine and control the actual amount of powder being conveyed in the carrier gas at any moment of time. While it is possible to accurately measure the rate of flow of the gas stream itself and to measure the amount of powder fed to the stream, it has been difficult to accurately and instantaneously measure the amount of powder actually being conveyed by the carrier gas.

The present invention pertains to and is an improvement over the flame spraying powder feeder described in "Powder Feed Device for Flame Spraying Guns," Ser. No. 605,647, filed Dec. 29, 1966 in the name of Horace S. Daley and now U.S. Pat. No. 3,501,097. In this application, fine flame spray powders are metered into a regulated amount of a carrier gas, the amount of the powder introduced being controlled responsive to the pressure drop in the conveying gas line downstream of the point of powder introduction.

The Daley type of feeder has advanced the art and has ameliorated the problems related to reliability and consistency of powder feed rate. It is mechanical, however, and has had difficulty in handling very fine powders, for example, those with a particle size predominantly smaller than 30 microns. Also, it is large and not suited for mounting directly onto a flame spray gun.

THIS INVENTION

In brief compass, the present invention is a powder feeding system comprising an enclosed hopper for containing powder in loose particulate form. The hopper is preferably subjected to mechanical vibration to keep the finely-divided powder which tends to pack in loose form. A carrier gas conduit connected to a carrier gas supply extends through the hopper in its lower portion and continues to a point of powder-carrier gas utilization. The carrier gas conduit at a point between the carrier gas supply and the point of powder-carrier gas utilization has connected thereto a powder intake conduit (sometimes referred to herein as an orifice) which extends into the hopper below the level of the powder and has a geometric design and arrangement such that there is no gravity flow of the powder therethrough into a carrier gas stream in the carrier gas conduit in the absence of a fluidizing gas flow therethrough. Fluidizing gas in a regulated amount is supplied to the hopper, preferably at a level above the level of solids therein so that in passing to the orifice it must pass through the mass of solids and be diffused thereby. The design of the hopper is such that the gas converges towards the powder intake conduit and fluidizes the powder in a fluidized zone in the immediate vicinity thereof, the powder surrounding the fluidized zone being non-fluidized and acting as a diffusion region for introducing the fluidized gas uniformly into the fluidized zone.

The carrier gas is supplied in a predetermined constant amount. The flow of the fluidizing gas is regulated by sensing the pressure at a point in the carrier gas line, which pressure is responsive to the mass flow rate of solids therethrough, and then using the change in the pressure in the conveying gas line, if any, to regulate the flow of the fluidizing gas. If the pressure should increase, the flow of the fluidizing gas is made to decrease, and vice versa.

In a preferred embodiment a fluidic amplifier known to the art is integrated into the system in such a manner as to control the mass flow rate of solids in the conveying gas line. This eliminates the need for any electric or electronic controls or the use of a conventional diaphram-type regulator, which regulators normally are not sensitive enough for this purpose.

It has been found that the system of the present invention has excellent repeatability from batch to batch, uniform control of the powder feed rate over a wide range of desired feed rates and, since the device does not have any moving parts in contact with the powder at any point, it is not subject to wear. It is relatively easy to clean and the device is inexpensive and requires little maintenance. Also the present system permits a fast build-up to the desired feed rate when the unit is first started.

Perhaps most important, this feed device will handle reliably very fine powders, such as - 30 microns with a satisfactory flow rate and a very good control of the rate of the flow.

THE DRAWING

The drawing is a simplified schematic illustration of one preferred embodiment of this invention.

DESCRIPTION AND SPECIFIC EXAMPLE

With reference to the drawing, a supply hopper contains an amount of a powder, such as a nickle-chromium alloy powder having a particle size predominantely in the range of −140 to +325 mesh (U.S. Std. Sieve). The hopper has an inlet 11 for the periodic addition of powder. It can be equipped with a vibrator 12 which is used, as necessary, to maintain the powder in loose free-flowing form and permeable to the passage of gas.

In the bottom portion of the hopper and extending therethrough is a conveying gas conduit 15 which has a downwardly opening powder intake conduit 16 within the hopper below the level of the powdered solids. Fluidizing gas is admitted to the hopper at a point external to any zone of fluidization of the solids in the immediate vicinity of orifice 16. As shown, the fluidizing gas is admitted to the top of the hopper by tube 31 and passes through the static mass of solids to the zone of fluidization. The gas has been admitted to the bottom of the hopper with fair fluidization being obtained, but occasionally slugs of solid would fall into the zone of fluidization. Less fluidizing gas is required with top introduction.

Gas is supplied to the system by a line 23, which has a solenoid shut-off valve 23a, and a portion of it is passed to the conveying gas conduit through a flow meter 22 which has control valve 22a. Another portion of the gas is passed through a flow meter 21 with its flow valve 21a and thence by tube 20 to fluidizing gas inlet. A pressure gage 17 can be attached to line 15 so as to be able to visually observe the pressure in that line.

The flow of the fluidizing gas is regulated in a preferred embodiment in the following manner. A fluidic amplifier generally indicated at 30 receives the fluidizing gas from a tube 20 and passes a greater portion of it into tube 31 and into the hopper 10. Excess gas not required for fluidization is vented from the fluidic amplifier by tube 32. Other fluidic devices can work on various flow phenomena such as wall attachment, vortex or momentum. As shown, for the preferred type which is known as a proportional amplifier, the gas will normally flow from tube 20 and largely pass into tube 31. However, if a control stream of gas supplied by tube 18 is introduced at approximately right angles to the passage of the fluidizing gas in the amplifier 30, it will deflect the main stream of fluidizing gas, or some of the fluidizing gas, into line 32. The greater the flow of the control gas from tube 18, the more of the gas from tube 20 that is bypassed into tube 32 and vented.

The pressure in the conveying gas line 15 at a point upstream of the orifice 16 is responsive to the mass flow rate in the conduit 15 downstream of the orifice. Therefore, if a pressure tap is placed at a point 14 on couduit 15, any change of pressure observed at this point can be used to regulate the amount of control gas supplied to the amplifier 30. This can be done, of course, through regular electrical means but since such means which rely on a pressure gage or the like are not normally sensitive enough for the present purposes, it is preferred to do this as follows. Tube 18 containing a valve 19 is attached to conduit 15 at point 14 and allows the passage of gas from point 14 to the amplifier 30 and this gas is used as the control gas in the amplifier. This flow of control gas amounts to a feedback signal, and since it is obtained at a point above the point of introduction of solids at the conduit 15, tube 18 is not subject to being blocked by solids. Valve 19 or a fixed orifice can be used to control the flow of the control gas and thus the signal size given to the amplifier. The amount of control gas passing through tube 18 will, of course, be responsive to any pressure changes in line 15. Thus, if this pressure should increase at point 14, the amount of gas flowing through tube 18 will increase. This in turn will cause a greater amount of the fluidizing gas passing through amplifier 30 from tube 20 to be deflected into venting tube 32 and a lesser amount of the fluidizing gas will flow into the hopper 10 via tube 31 resulting in a lesser amount of solids being introduced into the conveying gas through orifice 16.

Any type of fludic amplifier, preferably one without moving parts, can be used, provided it can be operated at suitable pressures, and flows for the feed back gas and flulidizing gas. The exact amount of amplification is not critical. It is desirable to choose an amplifier and flow rates that vent or waste as little gas as possible, especially if an expensive fluidizing gas is used. A vortex amplifier need not vent any gas as it controls the flow by pressure variations. Two or more amplifiers of the same or different type can be used in series, parallel or other combination to obtain a fluidic system of certain desired pressure and flow characteristics.

A proportional amplifier model No. 300092, manufactured by the Fluidonic Division, Imperial-Eastman Corp., Chicago, Ill. has been found to be satisfactory. With this device and using powdered zirconium oxide having a particle size distribution of roughly −200 mesh to +30 microns, the orifice size of orifice 16 was 0.078 inchs. the conveying gas flow rate was 10 cubic feet per hour, the fluidizing gas flow rate was 1 cfh, the pressure at gage 17 was approximately 3 psig. This powder was able to be fed into the flame of a plasma flame gun over a range of 1 to 10 pounds per hour with a repeatability within 5% from batch to batch and day to day. The particles melted satisfactorily and produced a good coating.

In another case, a very fine aluminum oxide powder, −30 to +5 microns, was fed at the rate of 5 pounds per hour with a repeatability of 5 percent.

It is preferred to arrange to vent the hopper when conveying gas is not being supplied thereto. To this end a tube 33 is attached to tube 31. A solenoid valve 33a is placed in tube 33.

In operation, when the flame spray gun is not being used, valve 23a is closed, valves 22a, 21a and 33a are open. Preferably valves 21a and 22a are preset for a given powder and desired feed rate and are not usually adjusted except to change feed rate. To start the system, valve 23a is opened simultaneously with the closing of valve 33a to commence flow of the conveying gas at a set level. The rate of fluidizing gas flow through tube 31 into hopper 10 is initially at a high level and then quickly drops as the rate of powder input into line 15 through orifice 16 increases until after about 5 to 10 seconds a stable level is reached, with a portion of the fluidizing gas being vented by a tube 32 under the action of the control gas supplied by tube 18. Feed rate is normally adjusted only by varying the setting of valve 21a which establishes the main flow of fluidizing gas.

It has been found that the admission of the fluidizing gas at the top of hopper 10 requires the use of less control gas than admission below the powder level, although the reason for this is not known. Also, top inlet of the fluidizing gas simplifies the apparatus and the ease of cleaning of the hopper. It was also found that there is no dependence of the solids feed rate on the height of the powder head in the hopper for a powder head up to about 4 inches and that there is normally no need for a pressure equalizing line running from the top to the bottom of the hopper. No previous non-mechanical powder feeding apparatus of this type is known to have been independent of the powder head. It is theorized that in the present feeding arrangement, powder in the vicinity of orifice 16 is fluidized and the size of this fluidized region varies with the powder head to compensate for any dependence of feed rate on the powder head that might exist. With only a portion of the powder fluidized, non-fluidized powder surrounding the fluidized zone acts as a diffusing region for introducing the fluidizing gas uniformly into the fluidized zone.

Although it is generally preferable to introduce the fluidizing gas above the powder level in the hopper, the gas can be introduced within the powder in the hopper be extending tube 31 downwards and terminating with an orifice within the powder. This is desirable for extremely fine powders, such as smaller than 5 microns that may pack and bridge in the hopper. However, it still is necessary not to bring the fluidizing gas orifice too close to orifice 16 or have it penetrate the zone of fluidized powder that surrounds the orifice during operation of the feeder.

Any convenient means can be used for introducing powder into the hopper. For example a reservoir hopper can be fitted to the top of the feeder hopper 10 in order to continuously replenish the powder in the feeder hopper during operation, such as is described in copending application, Ser. No. 605,647, now U.S. Pat. No. 3,501,097.

The carrier gas conduit can extend through the lower portion of the hopper in any convenient location. The conduit may even be adjacent to or even outside of the wall of the hopper, with the powder intake conduit orifice opening into the hopper. The orifice should open generally downwardly to prevent excessive influence by gravity on the flow, but the orifice opening need not point straight down. It is preferred that the geometric design and arrangement of the orifice be such that there is no gravity flow of the powder through the orifice into the carrier gas stream in the absence of fluidizing gas flow. Thus, in some cases, the orifice can be side-facing or even partially upwardly facing. For example, the orifice can consist of a short length of tube extending sideways to prevent the powder, with its particular angle of repose, from entering the conduit.

Satisfactory feeding has been obtained with some powders with an orifice that faces upwardly in situations where the powder tends to bridge over the orifice in the absence of fluidizing gas flow. With a 0.10 inch upwardly facing orifice and a chromimum carbide powder of −325 mesh +10 microns, there was no feeding in the absence of fluidizing gas flow although the carrier gas was flowing. Apparently, the slight pressure in the carrier gas conduit was sufficient to cause the powder to bridge the orifice. With a 3/16 inch upturned orifice, erractic feeding resulted presumably because of gravity flow. The maximum useful upturned orifice size for most commercial powders is about 0.150 inches.

Experience has shown that the use of the fluidic amplifier feedback control is particularly desirable with flame sprayers where extremely precise feed rate control is required; without minor but disturbing flow rate fluctuations may occur regardless of the care taken in adjusting the flow rates of the conveying gas and the fluidizing gas. Also, without the feed back control of the present invention, consistent delivery of powder cannot be reproduced from run to run or batch to batch without considerable experimentation. The repeatability in control of the powder feed in the present device is excellent. There are no moving parts in contact with the powder that require a lot of adjustments or that are subject to wear.

The fluidic amplifier does of course increase the cost of the feeder. It has been found that the technique of controlled local or zonal fluidizing within the hopper so improves the reliability of feeding that the feeder can be used with good results without the amplifier for those applications that do not require a high degree of precision. Thus, the feeder can be of relatively low cost and can be easily directly mounted on the gun, where simplicity is important.

Having deecribed this invention, what is sought to be protected by Letters Patent is succinctly set forth in the following claims.

What is claimed is:

1. A powder feeding system for a flame spray gun comprising:
    a. an enclosed hopper containing a powder to be flame sprayed in loose particulate form;
    b. a gas conduit connected to a carrier gas supply and extending to a point of powder carrier gas utilization;
    c. A powder intake conduit connected to said gas conduit at a point between said gas supply and said point of utilization and extending into said hopper below the level of said powder and having a geometric design and arrangement such that there is no gravity flow of the powder therethrough into a carrier gas stream in said gas conduit in the absence of a fludizing gas flow therethrough;
    d. a fluidizing gas conduit adapted to discharge a regulated amount of fluidizing gas under pressure into said hopper at a point remote from the fluidized zone referred to in (e);
    e. said hopper being adapted to cause the fluidizing gas to pass through the powder therein and converge towards said intake conduit and fluidize the powder in the immediate vicinity thereof; and
    f. a fluidized zone of said powder in said hopper in the immediate vicinity of said powder intake conduit, the powder surrounding the fluidized zone being non-fluidized and acting as a diffusing region for introducing fluidized gas uniformly into said fluidized zone.

2. A powder feeding system for a flame spray gun comprising:
    a. an enclosed hopper containing powder to be flame sprayed in loose particulate form;
    b. a gas conduit connected to a carrier gas supply and extending to a point of powder carrier gas utilization;
    c. a powder intake conduit connected to said gas conduit at a point between said gas supply and said point of utilization and extending into said hopper below the level of said powder and having a geometric design and arrangement such that there is no gravity flow of the powder therethrough into a carrier gas stream in said gas conduit in the absence of a fluidizing gas flow therethrough;
    d. a fluidizing gas conduit adapted to discharge a regulated amount of fluidizing gas under pressure into said hopper at a point remote from the fluidized zone referred to in (f);

e. means for sensing the pressure of the carrier gas at a point in said gas conduit and means responsive to a change in said carrier gas pressure which is adapted to regulate the flow of said fluidizing gas inversely to said change;

f. said hopper being adapted to cause the fluidizing gas to pass through the powder therein and converge towards said intake conduit and fluidize the powder in the immediate vicinity thereof; and g. a fluidized zone of said powder in said hopper in the immediate vicinity of said powder intake conduit, the powder surrounding the fluidized zone being non-fluidized and acting as a diffusing region for introducing fluidized gas uniformly into said fluidized zone.

3. Feeding system of claim 2 wherein said fluidizing gas is admitted to the hopper at a point above the level of the powder therein.

4. Feeding system of claim 2 wherein the geometric design and arrangement of said powder intake conduit is such that the powder intake conduit is partially upwardly facing to generally downwardly facing.

5. Feeding system of claim 2 wherein the geometric design and arrangement of the powder intake conduit are such that the powder intake conduit faces upwardly and has a maximum orifice size of about 0.150 inches.

6. Feeding system of claim 2 wherein said gas conduit extends through the lower portion of said hopper and said powder intake conduit is side-facing to generally downwardly facing.

7. Feeding system of claim 2 wherein said point of pressure measurement is upstream of said powder intake conduit and the means for regulating the flow of fluidizing gas is a fluidic amplifier.

8. The system of claim 7 wherein said fluidic amplifier has a main passageway for passing said fluidizing gas to said fluidizing gas conduit, a tap-off gas passageway adapted to remove gas from said main passageway, and a control gas passageway connected to said main passageway upstream of said tap-off gas passageway and adapted to admit a stream of control gas into said main passageway and deflect gas passing therethrough into said tap-off gas passageways and wherein a control gas conduit connects said point of pressure measurement to said control gas passageway and is adapted to pass control gas in a regulated amount from and responsive to said pressure in said carrier gas conduit to said control gas passageway.

9. Feeding system of claim 2 comprising in addition thereto a shut-off valve in said carrier gas conduit, a second shut-off valve in said fluidizing gas conduit and a valved venting conduit connecting with the upper portion of said hopper and adapted to be open when said shut-off valves are closed.

* * * * *

REEXAMINATION CERTIFICATE (491st)
United States Patent [19]
Fabel

[11] B1 3,976,332
[45] Certificate Issued Apr. 22, 1986

[54] POWDER FEED DEVICE FOR FLAME SPRAY GUNS

[75] Inventor: Arthur J. Fabel, Westbury, N.Y.

[73] Assignee: Metco, Inc., Westbury, N.Y.

Reexamination Request:
No. 90/000,649, Oct. 12, 1984

Reexamination Certificate for:
Patent No.: 3,976,332
Issued: Aug. 24, 1976
Appl. No.: 218,888
Filed: Jan. 19, 1972

Related U.S. Application Data

[63] Continuation of Ser. No. 836,929, Jun. 26, 1969, abandoned.

[51] Int. Cl.⁴ ............................................. B65G 53/40
[52] U.S. Cl. ........................................ 406/14; 406/146
[58] Field of Search .................... 406/14, 30, 141–144, 406/146, 136

[56] References Cited

U.S. PATENT DOCUMENTS

| | | | |
|---|---|---|---|
| 2,181,095 | 11/1939 | Ness | 406/141 X |
| 2,758,564 | 8/1956 | Randall | |
| 2,762,658 | 9/1956 | Shirk | 406/14 |
| 2,792,262 | 5/1957 | Hatborn | |
| 2,801,136 | 7/1957 | Haddad | 406/142 X |
| 2,916,441 | 12/1959 | Kruse, Jr. | 406/30 X |
| 2,919,160 | 12/1959 | Blackburn | 406/144 X |
| 2,941,842 | 6/1960 | Wishaw | |
| 3,001,829 | 9/1961 | De Saint-Martin | 406/146 X |
| 3,163,329 | 12/1964 | Mornas | 406/30 X |
| 3,236,422 | 2/1966 | Bailey et al. | |
| 3,345,111 | 10/1967 | Bies et al. | 406/144 X |
| 3,501,062 | 3/1970 | DeWitt et al. | |

*Primary Examiner*—Jeffrey V. Nase
*Attorney, Agent, or Firm*—Herbert S. Ingham; Francis L. Masselle; Edwin T. Grimes

[57] ABSTRACT

A device for feeding metal powders suspended in a conveying gas uniformly and controllably to a point of utilization such as a flame spray gun comprising an enclosed hopper which contains the powder in particulate loose and by and large unfluidized form and is supplied in its upper portion with a controlled amount of fluidizing gas. A conduit with a downwardly opening powder intake [conduit] *orifice in its sidewall* passes through the lower portion of the hopper and is supplied with a conveying gas at a pre-determined rate. The fluidizing gas passes through the mass of solids and is diffused thereby. It converges towards the orifice, suspends the powder in the vicinity of the orifice, upturning into the orifice to do so, and propels the fluidized powder therethrough into the conveying gas. The amount of fluidizing gas flow determines the amount of solids placed in the conveying gas. The fluidizing gas flow is controlled inversely responsive to the pressure at a point in the conveying gas [line] *conduit*.

Preferably, a fluidic amplifier or controller is integrated into the system for the purpose of regulating the flow of the fluidizing gas. In this embodiment, the control gas for the amplifier is tapped from the conveying gas [line] *conduit* upstream of the solids inlet orifice. The flow of control gas is thereby automatically regulated by the pressure in the control gas [line] *conduit* at the point of tapping, which pressure is responsive to the mass flow rate in the conveying gas line downstream of the solids inlet orifice.

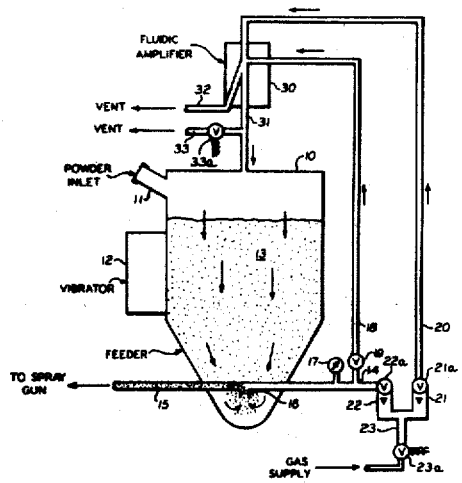

B1 3,976,332

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY THE AMENDMENT ARE PRINTED HEREIN.

Column 4, lines 11–22:
Any type of [fludic] *fluidic* amplifier, preferably one without moving parts, can be used, provided it can be operated at suitable pressures, and flows for the feed back gas and [flulidizing] *fluidizing* gas. The exact amount of amplification is not critical. It is desirable to choose an amplifier and flow rates that vent or waste as little gas as possible, especially if an expensive fluidizing gas is used. A vortex amplifier need not vent any gas as it controls the flow by pressure variations. Two or more amplifiers of the same or different type can be used in series, parallel or other combination to obtain a fluidic system of certain desired pressure and flow characteristics.

AS A RESULT OF REEXAMINATION, IT HAS BEEN DETERMINED THAT:

Claims 1, 2 and 4–7 are determined to be patentable as amended.

Claims 3, 8 and 9, dependent on an amended claim, are determined to be patentable.

1. A powder feeding system for a flame spray gun comprising:
   a. an enclosed hopper containing a powder to be flame sprayed in loose particulate form;
   [b. a gas conduit connected to a carrier gas supply and extending to a point of powder carrier gas utilization; c. A powder intake conduit connected to said gas conduit at a point between said gas supply and said point of utilization and extending into said hopper below the level of said powder and having a geometric design and arrangement such that there is no gravity flow of the powder therethrough into a carrier gas stream in said gas conduit in the absence of a fludizing gas flow therethrough;]
   b. *gas conduit means for entraining said powder in a carrier gas comprising a tubular member having in its wall a powder intake orifice disposed below the level of said powder, said tubular member having an inlet end connected to a source of said carrier gas, and said gas conduit means having a geometric design and arrangement such that there is no flow of said powder into said tubular member through said orifice in the absence of a flow of pressurized fluidizing gas through said orifice;*
   c. *outlet means connected to an outlet end of said tubular member for transporting said entrained powder in said carrier gas from said tubular member to a point of utilization;*
   d. a fluidizing gas conduit adapted to discharge a regulated amount of *pressurized* fluidizing gas [under pressure] into said hopper at a point remote from the fluidized zone referred to in ([e]*f*);
   e. said hopper being adapted to cause the fluidizing gas to pass through the powder therein and converge towards said intake [conduit] *orifice* and fluidize the powder in the immediate vicinity thereof; and
   f. a fluidized zone of said powder in said hopper in the immediate vicinity of said powder intake [conduit] *orifice,* the powder surrounding the fluidized zone being non-fluidized and acting as a diffusing region for introducing fluidized gas uniformly into said fluidized zone.

2. A powder feeding system for a flame spray gun comprising:
   a. an enclosed hopper containing a powder to be flame sprayed in loose particulate form;
   [b. a gas conduit connected to a carrier gas supply and extending to a point of powder carrier gas utilization; c. a powder intake conduit connected to said gas conduit at a point between said gas supply and said point of utilization and extending into said hopper below the level of said powder and having a geometric design and arrangement such that there is no gravity flow of the powder therethrough into a carrier gas stream in said gas conduit in the absence of a fluidizing gas flow therethrough;]
   b. *gas conduit means for entraining said powder in a carrier gas comprising a tubular member having in its wall a powder intake orifice disposed below the level of said powder, said tubular member having an inlet end connected to a source of said carrier gas, and said gas conduit means having a geometric design and arrangement such that there is no flow of said powder into said tubular member thru said orifice in the absence of a flow of pressurized fluidizing gas through said orifice;*
   c. *outlet means connected to an outlet end of said tubular member for transporting said entrained powder in said carrier gas from said tubular member to a point of utilization;*
   d. a fluidizing gas conduit adapted to discharge a regulated amount of *pressurized* fluidizing gas [under pressure] into said hopper at a point remote from the fluidized zone referred to in ([f]*g*);
   e. means for sensing the pressure of the carrier gas at a point in said gas conduit and means responsive to a change in said carrier gas presssure which is adapted to regulate the flow of said fluidizing gas inversely to said change;
   f. said hopper being adapted to cause the fluidizing gas to pass through the powder therein and converge towards said intake [conduit] *orifice* and fluidize the powder in the immediate vicinity thereof; and
   g. A fluidized zone of said powder in said hopper in the immediate vicinity of said powder intake [conduit] *orifice,* the powder surrounding the fluidized zone being non-fluidized and acting as a diffusing region for introducing fluidized gas uniformly into said fluidized zone.

4. Feeding system of claim 2 wherein the geometric design and arrangement of said powder intake [conduit] *orifice* is such that the powder intake [conduit] *orifice* is partially upwardly facing to generally downwardly facing.

5. Feeding system of claim 2 wherein the geometric design and arrangement of the powder intake [conduit] *orifice* are such that the powder intake [conduit] *orifice* faces upwardly and has a maximum orifice size of about 0.150 inches.

6. Feeding system of claim 2 wherein said gas conduit extends through the lower portion of said hopper and said powder intake [conduit] *orifice* is side-facing to generally downwardly facing.

7. Feeding system of claim 2 wherein said point of pressure measurement is upstream of said powder intake [conduit] *orifice* and the means for regulating the flow of fluidizing gas in a fluidic amplifier.

* * * * *